(12) United States Patent
He et al.

(10) Patent No.: US 12,085,801 B2
(45) Date of Patent: Sep. 10, 2024

(54) BACKLIGHT MODULE AND LIQUID CRYSTAL DISPLAY DEVICE

(71) Applicant: WUHAN CHINA STAR OPTOELECTRONICS TECHNOLOGY CO., LTD., Hubei (CN)

(72) Inventors: Rui He, Hubei (CN); Wei Cheng, Hubei (CN); Changchih Huang, Hubei (CN); Guanghui Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 750 days.

(21) Appl. No.: 17/284,487

(22) PCT Filed: Mar. 31, 2021

(86) PCT No.: PCT/CN2021/084245
§ 371 (c)(1),
(2) Date: Apr. 12, 2021

(87) PCT Pub. No.: WO2022/198697
PCT Pub. Date: Sep. 29, 2022

(65) Prior Publication Data
US 2022/0365393 A1    Nov. 17, 2022

(30) Foreign Application Priority Data
Mar. 22, 2021   (CN) .......................... 202110300652.7

(51) Int. Cl.
G02F 1/13357   (2006.01)
G02F 1/1333    (2006.01)
(Continued)

(52) U.S. Cl.
CPC .... *G02F 1/133603* (2013.01); *G02F 1/13338* (2013.01); *G02F 1/1334* (2013.01);
(Continued)

(58) Field of Classification Search
CPC ..... G02F 1/1347–13478; G02F 1/1323; G02F 1/133602–133613; G06V 40/1318
See application file for complete search history.

(56) References Cited

U.S. PATENT DOCUMENTS

| 8,026,880 B2* | 9/2011 | Mimura | G02B 5/003 |
| | | | 345/204 |
| 2009/0167968 A1* | 7/2009 | Hsu | G02F 1/13362 |
| | | | 359/465 |

(Continued)

FOREIGN PATENT DOCUMENTS

| CN | 106886341 A | 6/2017 |
| CN | 107480584 A | 12/2017 |

(Continued)

*Primary Examiner* — Mariceli Santiago
(74) *Attorney, Agent, or Firm* — PV IP PC; Wei Te Chung

(57) ABSTRACT

A backlight module and a liquid crystal display device are provided. The backlight module includes a first optical element which can switch between a transparent state and a scattering state, first light sources, and a light-shielding layer disposed on a light path of light emitted from the first light sources to a liquid crystal display panel. The light-shielding layer includes a plurality of gratings arranged at intervals, each of the gratings is made of a light-shielding material, and one light transmission gap is formed between any two adjacent gratings, thereby improving uniformity of backlight.

20 Claims, 6 Drawing Sheets

(51) Int. Cl.
*G02F 1/1334* (2006.01)
*G02F 1/1335* (2006.01)
*G06V 40/13* (2022.01)

(52) U.S. Cl.
CPC .. *G02F 1/133512* (2013.01); *G02F 1/133605* (2013.01); *G02F 1/133607* (2021.01); *G06V 40/1318* (2022.01)

(56) References Cited

U.S. PATENT DOCUMENTS

| | | | |
|---|---|---|---|
| 2011/0080538 A1* | 4/2011 | Shiota | ................ G03F 7/2053 349/61 |
| 2016/0047954 A1 | 2/2016 | Wang | |
| 2020/0408982 A1 | 12/2020 | Kallassi et al. | |

FOREIGN PATENT DOCUMENTS

| | | | |
|---|---|---|---|
| CN | 108989497 | A | 12/2018 |
| CN | 110263773 | A | 9/2019 |
| CN | 110737132 | A | 1/2020 |
| CN | 210270454 | U | 4/2020 |
| CN | 111352268 | A | 6/2020 |
| CN | 111752027 | A | 10/2020 |
| CN | 111965873 | A | 11/2020 |
| CN | 111983837 | A | 11/2020 |

* cited by examiner

BACKLIGHT MODULE AND LIQUID CRYSTAL DISPLAY DEVICE

FIELD OF INVENTION

The present disclosure relates to the field of display technologies, and more particularly, to a backlight module and a liquid crystal display device.

BACKGROUND OF INVENTION

At present, screens of liquid crystal display devices are gradually developing toward full screens. However, higher and higher screen ratios make it impossible to place sensors, such as fingerprint sensors and cameras, in screen areas, so under-screen sensing technologies have emerged. The under-screen sensing technologies refer to disposing the sensors under the screens. In order to improve precision of under-screen sensors, backlight modules which can switch between a transparent state and a scattering state are usually applied to the liquid crystal display devices. However, light emitted from the backlight modules has a larger viewing angle, which causes nonuniform backlight and affects a display effect of the liquid crystal display devices.

Technical problem: the present disclosure provides a backlight module and a liquid crystal display device to solve a problem of poor display effect in current liquid crystal display devices.

SUMMARY OF INVENTION

In a first aspect, the present disclosure provides a backlight module, which is configured to provide backlight to a liquid crystal display panel including a sensing area and a non-sensing area and includes: a first light source component and a light-shielding layer, wherein, the first light source component includes a first optical element and first light sources, the first optical element can switch between a transparent state and a scattering state, and the first light sources are disposed on side surfaces of the first optical element or one side of the first optical element away from the liquid crystal display panel; the light-shielding layer is disposed on a light path of light emitted from the first light sources to the liquid crystal display panel and includes a plurality of gratings arranged at intervals, each of the gratings is made of a light-shielding material, and one light transmission gap is formed between any two adjacent gratings.

In some embodiments, the first optical element includes a first area and a second area, the first area is defined corresponding to the sensing area, the second area is defined corresponding to the non-sensing area, and the first area is controlled to switch between the transparent state and the scattering state.

In some embodiments, the first light sources are disposed on the side surfaces of the first optical element, and the light-shielding layer is disposed between the first optical element and the liquid crystal display panel.

In some embodiments, the first light sources are disposed on the side of the first optical element away from the liquid crystal display panel, and the light-shielding layer is disposed between the first optical element and the liquid crystal display panel and/or between the first light sources and the first optical element.

In some embodiments, the first light sources are disposed on the side of the first optical element away from the liquid crystal display panel and correspond to the sensing area, and the light-shielding layer is disposed between the first optical element and the liquid crystal display panel and/or between the first light sources and the first optical element and corresponds to the sensing area; and the backlight module further includes a second light source component disposed on the side of the first optical element away from the liquid crystal display panel and corresponding to the non-sensing area.

In some embodiments, the first optical element is disposed corresponding to the sensing area, the first light sources are disposed on the side surfaces of the first optical element, and the light-shielding layer is disposed between the first optical element and the liquid crystal display panel and corresponds to the sensing area; and the backlight module further includes a second light source component disposed between the first optical element and the liquid crystal display panel and corresponding to the non-sensing area.

In some embodiments, the first optical element is disposed corresponding to the sensing area, the first light sources are disposed on the side of the first optical element away from the liquid crystal display panel, and the light-shielding layer is disposed between the first optical element and the liquid crystal display panel and/or between the first light sources and the first optical element and corresponds to the sensing area; and the backlight module further includes a second light source component disposed between the first optical element and the liquid crystal display panel and corresponding to the non-sensing area.

In some embodiments, cross-sectional shapes of the gratings are rectangular and have a same size, a width of the gratings ranges from 1 to 50 μm, and a height of the gratings ranges from 1 to 100 μm.

In some embodiments, the first optical element includes a first substrate, a second substrate, and liquid crystals sandwiched between the first substrate and the second substrate, the first substrate and the second substrate are made of a transparent material, and the liquid crystals are polymer dispersed liquid crystals or polymer network liquid crystals.

In some embodiments, the second light source component includes a second optical element and a second light source, the second optical element includes a reflective sheet, a light guide plate, a diffuser sheet, and a prism sheet disposed in a stack, and the second light source is disposed on one side surface of the second optical element or one side of the second optical element away from the liquid crystal display panel.

In a second aspect, the present disclosure provides a liquid crystal display device, which includes a liquid crystal display panel, a sensor, and a backlight module;

wherein, the liquid crystal display panel includes a sensing area and a non-sensing area;

the backlight module is configured to provide backlight to the liquid crystal display panel and includes: a first light source component and a light-shielding layer, wherein the first light source component includes a first optical element and first light sources, the first optical element switches between a transparent state and a scattering state, and the first light sources are disposed on side surfaces of the first optical element or one side of the first optical element away from the liquid crystal display panel; the light-shielding layer is disposed on a light path of light emitted from the first light sources to the liquid crystal display panel and includes a plurality of gratings arranged at intervals, each of the gratings is made of a light-shielding material, and one light transmission gap is formed between any two adjacent gratings; and the sensor is disposed on one side of the backlight module away from the liquid crystal display panel and corresponds to the sensing area.

In some embodiments, the first optical element includes a first area and a second area, the first area is defined corresponding to the sensing area, the second area is defined corresponding to the non-sensing area, and the first area is controlled to switch between the transparent state and the scattering state.

In some embodiments, the first light sources are disposed on the side surfaces of the first optical element, and the light-shielding layer is disposed between the first optical element and the liquid crystal display panel.

In some embodiments, the first light sources are disposed on the side of the first optical element away from the liquid crystal display panel, and the light-shielding layer is disposed between the first optical element and the liquid crystal display panel and/or between the first light sources and the first optical element.

In some embodiments, the first light sources are disposed on the side of the first optical element away from the liquid crystal display panel and correspond to the sensing area, and the light-shielding layer is disposed between the first optical element and the liquid crystal display panel and/or between the first light sources and the first optical element and corresponds to the sensing area; and the backlight module further includes a second light source component disposed on the side of the first optical element away from the liquid crystal display panel and corresponding to the non-sensing area.

In some embodiments, the first optical element is disposed corresponding to the sensing area, the first light sources are disposed on the side surfaces of the first optical element, and the light-shielding layer is disposed between the first optical element and the liquid crystal display panel and corresponds to the sensing area; and the backlight module further includes a second light source component disposed between the first optical element and the liquid crystal display panel and corresponding to the non-sensing area.

In some embodiments, the first optical element is disposed corresponding to the sensing area, the first light sources are disposed on the side of the first optical element away from the liquid crystal display panel, and the light-shielding layer is disposed between the first optical element and the liquid crystal display panel and/or between the first light sources and the first optical element and corresponds to the sensing area; and the backlight module further includes a second light source component disposed between the first optical element and the liquid crystal display panel and corresponding to the non-sensing area.

In some embodiments, cross-sectional shapes of the gratings are rectangular and have a same size, a width of the gratings ranges from 1 to 50 μm, and a height of the gratings ranges from 1 to 100 μm.

In some embodiments, the first optical element includes a first substrate, a second substrate, and liquid crystals sandwiched between the first substrate and the second substrate, the first substrate and the second substrate are made of a transparent material, and the liquid crystals are polymer dispersed liquid crystals or polymer network liquid crystals.

In some embodiments, the second light source component includes a second optical element and a second light source,
the second optical element includes a reflective sheet, a light guide plate, a diffuser sheet, and a prism sheet disposed in a stack, and the second light source is disposed on one side surface of the second optical element or one side of the second optical element away from the liquid crystal display panel.

Beneficial effect: the backlight module provided by the present disclosure is configured to provide backlight to the liquid crystal display panel and includes: the first light source component, which includes the first optical element that can switch between the transparent state and the scattering state, and the first light sources that are disposed on the side surfaces of the first optical element or the side of the first optical element away from the liquid crystal display panel; and the light-shielding layer disposed on the light path of the light emitted from the first light sources to the liquid crystal display panel and including the plurality of gratings arranged at intervals, wherein, each of the gratings is made of the light-shielding material, and one light transmission gap is formed between any two adjacent gratings. The light emitted to the liquid crystal display panel can be ensured to have a narrower viewing angle by disposing the light-shielding layer in the liquid crystal display device, thereby improving uniformity of backlight and further improving a display effect of the liquid crystal display device.

DETAILED DESCRIPTION OF PREFERRED EMBODIMENTS

Figure 1:
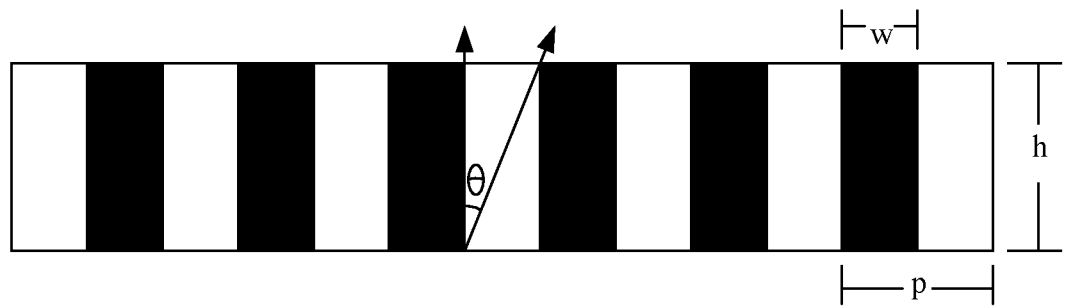
FIG. 1 is a schematic structural diagram of a light-shielding layer according to an embodiment of the present disclosure.

In order to make the purpose, technical solutions, and effects of the present disclosure clearer and more definite, the following further describes the present disclosure in detail with reference to the drawings and embodiments. It should be understood that the specific embodiments described herein are only used to explain the disclosure, and are not used to limit the disclosure.

An embodiment of the present disclosure provides a backlight module. The backlight module is applied to a liquid crystal display device and can ensure light emitted to a liquid crystal display panel to have a narrower viewing angle. Therefore, uniformity of backlight can be improved, and a display effect of the liquid crystal display device can be further improved. The liquid crystal display device having the backlight module applying thereto includes:

the liquid crystal display panel, the backlight module, and a sensor. Wherein, the liquid crystal display panel includes a sensing area and a non-sensing area. The sensing area refers to an area corresponding to the sensor. The sensor may be a fingerprint sensor or a camera. If the sensor is the fingerprint sensor, light containing fingerprint information can pass through this area and be emitted to the fingerprint sensor to perform fingerprint recognition. If the sensor is the camera, light containing external image information can pass through this area and be emitted to the camera corresponding thereto to form an image. In the following, the fingerprint sensor is taken as an example to describe the liquid crystal display device in detail. The non-sensing area refers to an area excluding the sensing area in the liquid crystal display panel, and the non-sensing area is configured to display pictures.

The backlight module includes a first optical element and first light sources.

The first optical element can switch between a transparent state and a scattering state. The first optical element may include a first substrate, a second substrate, and liquid crystals sandwiched between the first substrate and the second substrate, the first substrate and the second substrate are made of a transparent material, and the liquid crystals are polymer dispersed liquid crystals or polymer network liquid crystals. Under control of voltages, the liquid crystals can switch between the transparent state and the scattering state, thereby allowing the first optical element to switch between the transparent state and the scattering state.

The first light sources may be side light type light sources or direct type light sources. Specifically, if the first light sources are the side light type light sources, the first light sources are disposed on side surfaces of the first optical element, and if the first light sources are the direct type light sources, the first light sources are disposed on one side of the first optical element away from the liquid crystal display panel. The first light sources may be light-emitting diodes, mini-light-emitting diodes, or micro light-emitting diodes, and are not specifically limited herein.

A light-shielding layer is disposed on a light path of light emitted from the first light sources to the liquid crystal display panel, and includes a plurality of gratings arranged at intervals. Wherein, each of the gratings is made of a light-shielding material, and one light transmission gap is formed between any two adjacent gratings.

FIG. 1 is a schematic structural diagram of the light-shielding layer provided in the embodiments. As shown in FIG. 1, the light-shielding layer has a shutter structure and includes the plurality of gratings (black rectangular areas shown in FIG. 1) arranged at intervals. Each of the gratings is made of the light-shielding material, and one light transmission gap is formed between any two adjacent gratings, which makes light emitted to the light-shielding layer partially pass through. Wherein, shapes of the gratings may be same or different, sizes of the gratings may be same or different, and widths of light transmission gaps between adjacent gratings may be same or different. In the embodiments of the present disclosure, the shapes and the sizes of the gratings are the same, a cross-sectional shape of each grating is rectangular, and the widths of the light transmission gaps between the adjacent gratings are the same. A width of the gratings is defined as w, a height of the gratings is defined as h, and a period of the gratings, that is a sum of widths of one grating and one adjacent light transmission gap, is p. A viewing angle θ of light passing through the light-shielding layer is: $\theta=\arctan[(p-w)/h]$. From FIG. 1, it can be seen that for the light emitted to the light-shielding layer, the light-shielding layer can shield light having a viewing angle greater than θ and only allows light having a viewing angle less than or equal to θ to pass through. Therefore, light emitted to the liquid crystal display panel can be ensured to have a narrower viewing angle by disposing the light-shielding layer on the light path of the light emitted from the first light sources to the liquid crystal display panel, thereby improving uniformity of backlight and further improving a display effect of the liquid crystal display device.

The backlight module in the embodiments of the present disclosure may have multiple structures. The liquid crystal display device obtained by applying the backlight module having various structures thereto are shown in FIGS. 2 to 12, respectively. The following describes the backlight module and the liquid crystal display device in detail with reference to FIGS. 2 to 12.

Figure 2:
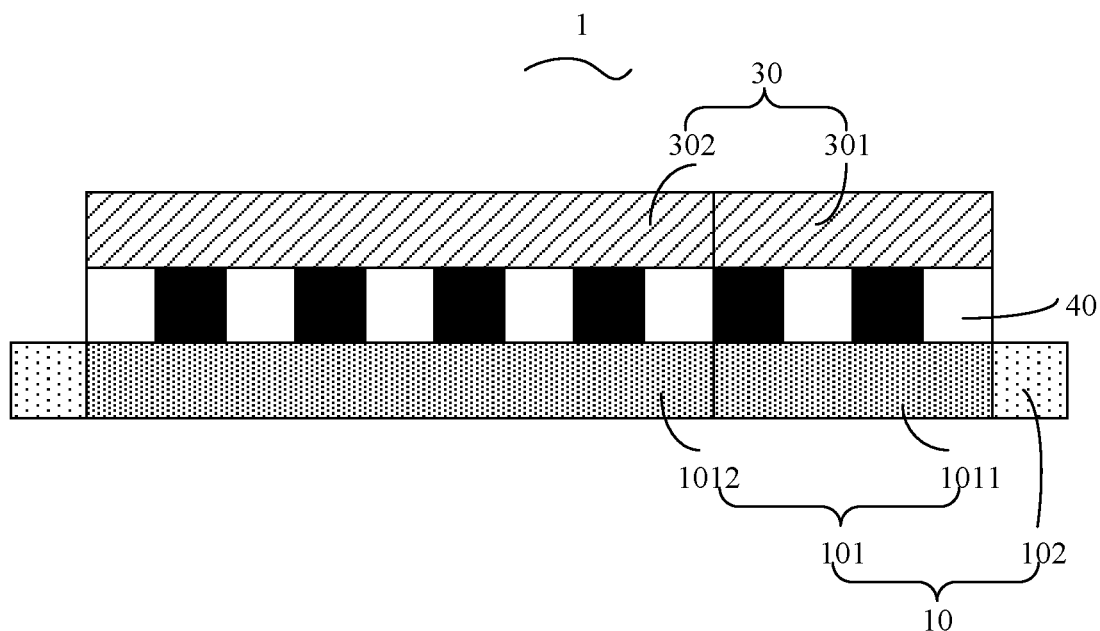
FIG. 2 is a first schematic structural diagram of a liquid crystal display device according to an embodiment of the present disclosure.

FIG. 2 is a first schematic structural diagram of the liquid crystal display device according to an embodiment of the present disclosure. As shown in FIG. 2, the liquid crystal display device 1 includes the liquid crystal display panel 30, the backlight module, and the sensor (not shown in FIG. 2).

Wherein, the liquid crystal display panel 30 includes the sensing area 301 and the non-sensing area 302.

The backlight module includes a first light source component 10 and the light-shielding layer 40, and the first light source component 10 includes the first optical element 101 and the first light sources 102. The first light sources 102 are disposed on the side surfaces of the first optical element 101, and the light-shielding layer 40 is disposed between the first optical element 101 and the liquid crystal display panel 30.

Specifically, a projection of the first optical element 101 on the liquid crystal display panel 30 shown in FIG. 2 totally covers the liquid crystal display panel 30, and lengths of the light-shielding layer 40 and the first optical element 101 are same.

Wherein, the first optical element 101 includes a first area 1011 and a second area 1012, the first area 1011 is defined corresponding to the sensing area 301, the second area 1012 is defined corresponding to the non-sensing area 302, and the first area 1011 and the second area 1012 can be controlled to switch between the transparent state and the scattering state, respectively. The following describes a working process of the liquid crystal display device 1 shown in FIG. 2.

During fingerprint recognition, the first area 1011 is in the transparent state by control of voltages, the first light sources 102 adjacent to the first area 1011 are turned off, and at this time, light containing fingerprint information can pass through the light-shielding layer 40 and the first area 1011 in sequence and is received by the fingerprint sensor to perform the fingerprint recognition. At a same time, the second area 1012 is in the scattering state by the control of voltages, the first light sources 102 adjacent to the second area 1012 are turned on, and at this time, the second area 1012, the first light sources 102, and the light-shielding layer 40 work together to provide backlight for the non-sensing area 302. That is, light emitted from the first light sources 102 passes through the second area 1012 and the light-shielding layer 40 in sequence to reach the non-sensing area 302. During normal display, the first optical element 101 is in the scattering state by the control of voltages, the first light sources 102 are turned on, and at this time, the first optical element 101, the first light sources 102, and the light-shielding layer 40 work together to provide the backlight for the liquid crystal display panel 30. That is, the light emitted from the first light sources 102 passes through the first optical element 101 and the light-shielding layer 40 in sequence to reach the liquid crystal display panel 30.

It should be noted that in order to prevent the light-shielding layer 40 positioned directly above the first area 1011 from shielding the light containing fingerprint information, the fingerprint sensor may be manufactured as a sensor array having a structure similar to the light-shielding layer 40, and a structure of the light-shielding layer 40 may be optimized, thereby minimizing an impact of shielding of the light-shielding layer 40 on the light containing fingerprint information.

Figure 3:
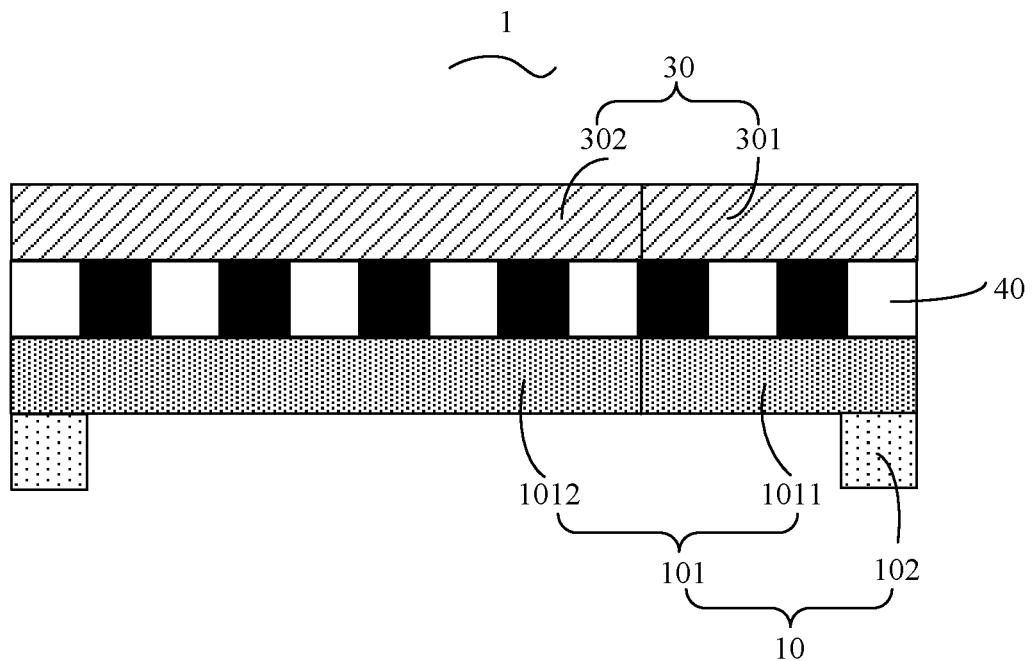
FIG. 3 is a second schematic structural diagram of the liquid crystal display device according to an embodiment of the present disclosure.
Figure 4:
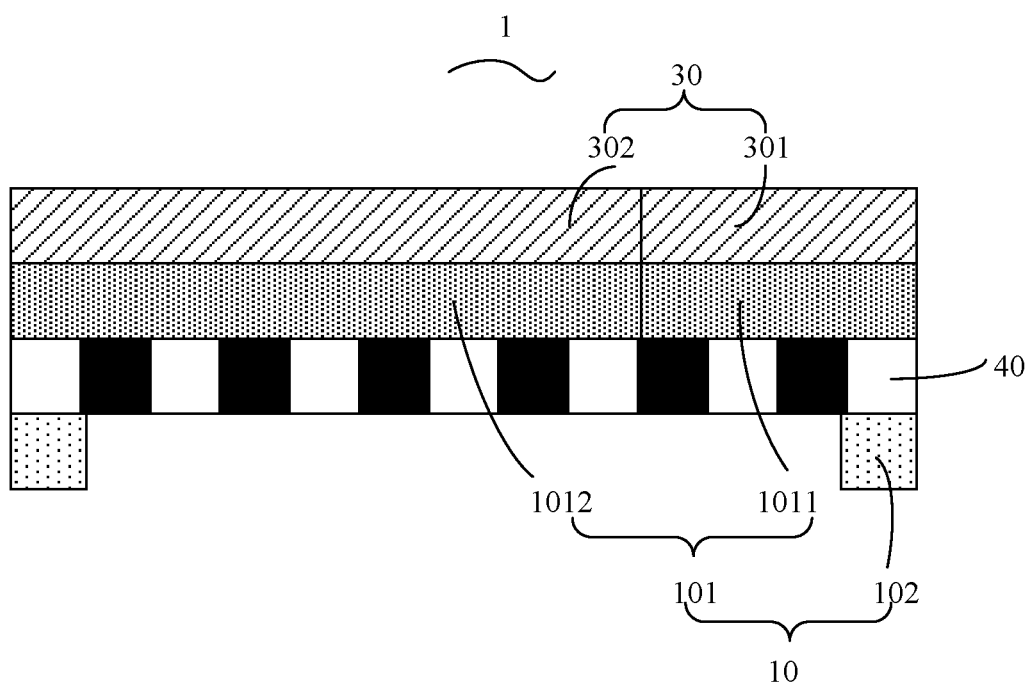
FIG. 4 is a third schematic structural diagram of the liquid crystal display device according to an embodiment of the present disclosure.
Figure 5:
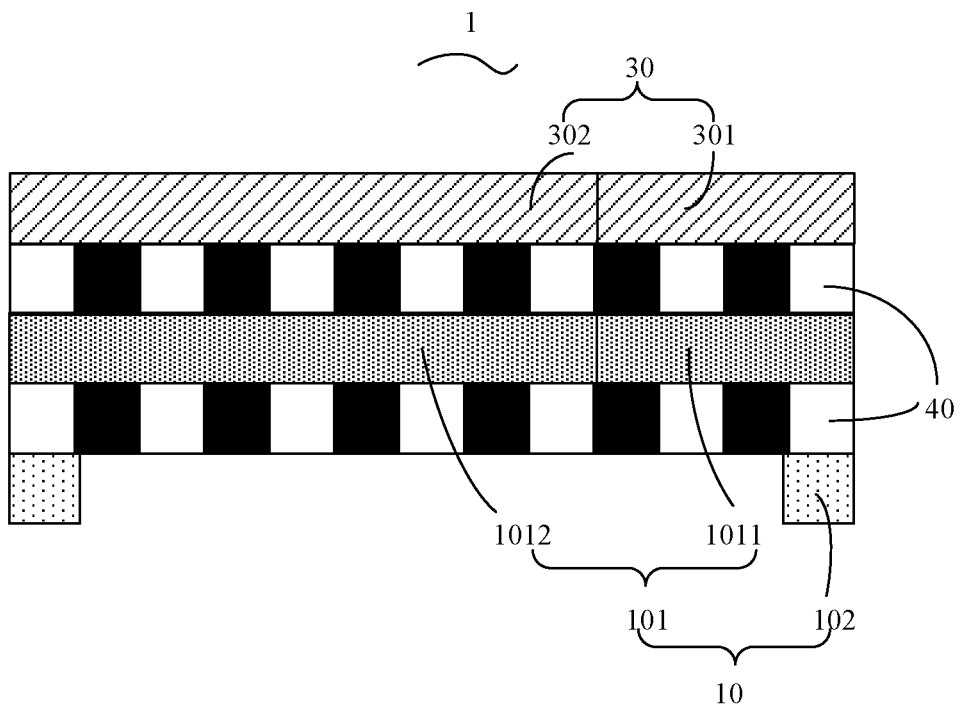
FIG. 5 is a fourth schematic structural diagram of the liquid crystal display device according to an embodiment of the present disclosure.

FIG. 3 is a second schematic structural diagram of the liquid crystal display device according to an embodiment of the present disclosure, FIG. 4 is a third schematic structural diagram of the liquid crystal display device according to an embodiment of the present disclosure, and FIG. 5 is a fourth schematic structural diagram of the liquid crystal display device according to an embodiment of the present disclosure. As shown in FIGS. 3 to 5, the liquid crystal display device 1 includes the liquid crystal display panel 30, the backlight module, and the sensor (not shown in FIG. 3).

Wherein, the liquid crystal display panel 30 includes the sensing area 301 and the non-sensing area 302.

The backlight module includes the first light source component 10 and the light-shielding layer 40, and the first light source component 10 includes the first optical element 101 and the first light sources 102. The first light sources 102 are disposed on the side of the first optical element 101 away from the liquid crystal display panel 30, and the light-shielding layer 40 is disposed between the first optical element 101 and the liquid crystal display panel 30 (referring to FIG. 3 for details), between the first light sources 102 and the first optical element 101 (referring to FIG. 4 for details), or between the first optical element 101 and the liquid crystal display panel 30 and between the first light sources 102 and the first optical element 101 (referring to FIG. 5 for details).

Specifically, the projection of the first optical element 101 on the liquid crystal display panel 30 shown in FIGS. 3 to 5 totally covers the liquid crystal display panel 30, and the lengths of the light-shielding layer 40 and the first optical element 101 are the same.

Wherein, the first optical element 101 includes the first area 1011 and the second area 1012, the first area 1011 is defined corresponding to the sensing area 301, the second area 1012 is defined corresponding to the non-sensing area 302, and the first area 1011 and the second area 1012 can be controlled to switch between the transparent state and the scattering state, respectively. The following describes working processes of the liquid crystal display device 1 shown in FIGS. 3 to 5, respectively.

For the liquid crystal display device 1 shown in FIG. 3, during the fingerprint recognition, the first area 1011 is in the transparent state by the control of voltages, the first light sources 102 adjacent to the first area 1011 are turned off, and at this time, the light containing fingerprint information can pass through the light-shielding layer 40 and the first area 1011 in sequence and is received by the fingerprint sensor to perform the fingerprint recognition. At a same time, the second area 1012 is in the scattering state by the control of voltages, the first light sources 102 adjacent to the second area 1012 are turned on, and at this time, the second area 1012, the first light sources 102, and the light-shielding layer 40 work together to provide the backlight for the non-sensing area 302. That is, the light emitted from the first light sources 102 passes through the second area 1012 and the light-shielding layer 40 in sequence to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the liquid crystal display panel 30. That is, the light emitted from the first light sources 102 passes through the first optical element 101 and the light-shielding layer 40 in sequence to reach the liquid crystal display panel 30.

For the liquid crystal display device 1 shown in FIG. 4, during the fingerprint recognition, the first area 1011 is in the transparent state by the control of voltages, the first light sources 102 adjacent to the first area 1011 are turned off, and at this time, the light containing fingerprint information can pass through the first area 1011 and the light-shielding layer 40 in sequence and is received by the fingerprint sensor to perform the fingerprint recognition. At a same time, the second area 1012 is in the scattering state by the control of voltages, the first light sources 102 adjacent to the second area 1012 are turned on, and at this time, the second area 1012, the first light sources 102, and the light-shielding layer 40 work together to provide the backlight for the non-sensing area 302. That is, the light emitted from the first light sources 102 passes through the light-shielding layer 40 and the second area 1012 in sequence to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the liquid crystal display panel 30. That is, the light emitted from the first light sources 102 passes through the light-shielding layer 40 and the first optical element 101 in sequence to reach the liquid crystal display panel 30.

For the liquid crystal display device 1 shown in FIG. 5, during the fingerprint recognition, the first area 1011 is in the transparent state by the control of voltages, the first light sources 102 adjacent to the first area 1011 are turned off, and at this time, the light containing fingerprint information can pass through the light-shielding layer 40, the first area 1011, and the light-shielding layer 40 in sequence and is received by the fingerprint sensor to perform the fingerprint recognition. At a same time, the second area 1012 is in the scattering state by the control of voltages, the first light sources 102 adjacent to the second area 1012 are turned on, and at this time, the second area 1012, the first light sources 102, and the light-shielding layer 40 work together to provide the backlight for the non-sensing area 302. That is, the light emitted from the first light sources 102 passes through the light-shielding layer 40, the second area 1012, and the light-shielding layer 40 in sequence to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the liquid crystal display panel 30. That is, the light emitted from the first light sources 102 passes through the light-shielding layer 40, the first optical element 101, and the light-shielding layer 40 in sequence to reach the liquid crystal display panel 30.

It should be noted that in order to prevent the light-shielding layer 40 positioned directly above and/or directly below the first area 1011 from shielding the light containing fingerprint information, the fingerprint sensor may be manufactured as the sensor array having the structure similar to the light-shielding layer 40, and the structure of the light-shielding layer 40 may be optimized, thereby minimizing the impact of shielding of the light-shielding layer 40 on the light containing fingerprint information.

Figure 6:
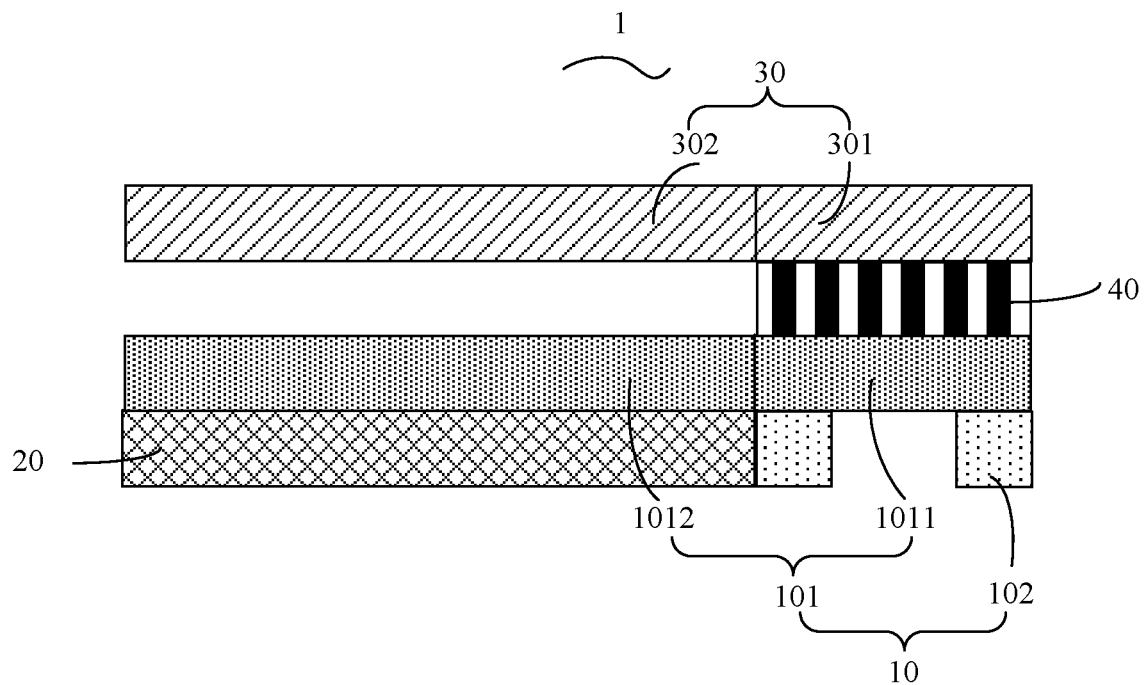
FIG. 6 is a fifth schematic structural diagram of the liquid crystal display device according to an embodiment of the present disclosure.
Figure 7:
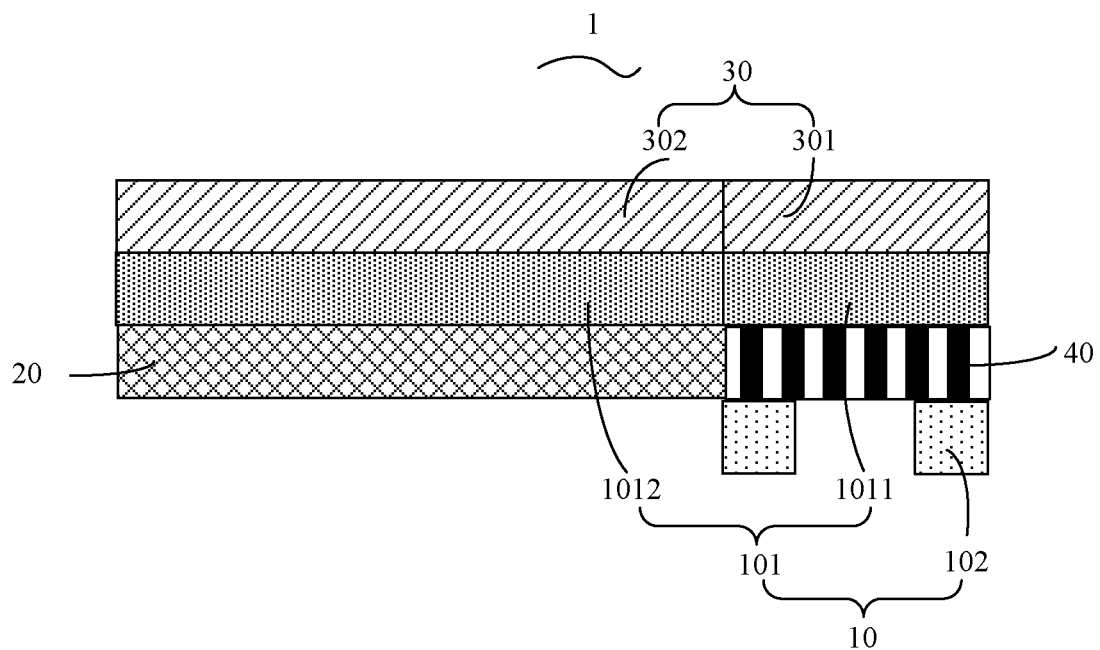
FIG. 7 is a sixth schematic structural diagram of the liquid crystal display device according to an embodiment of the present disclosure.
Figure 8:
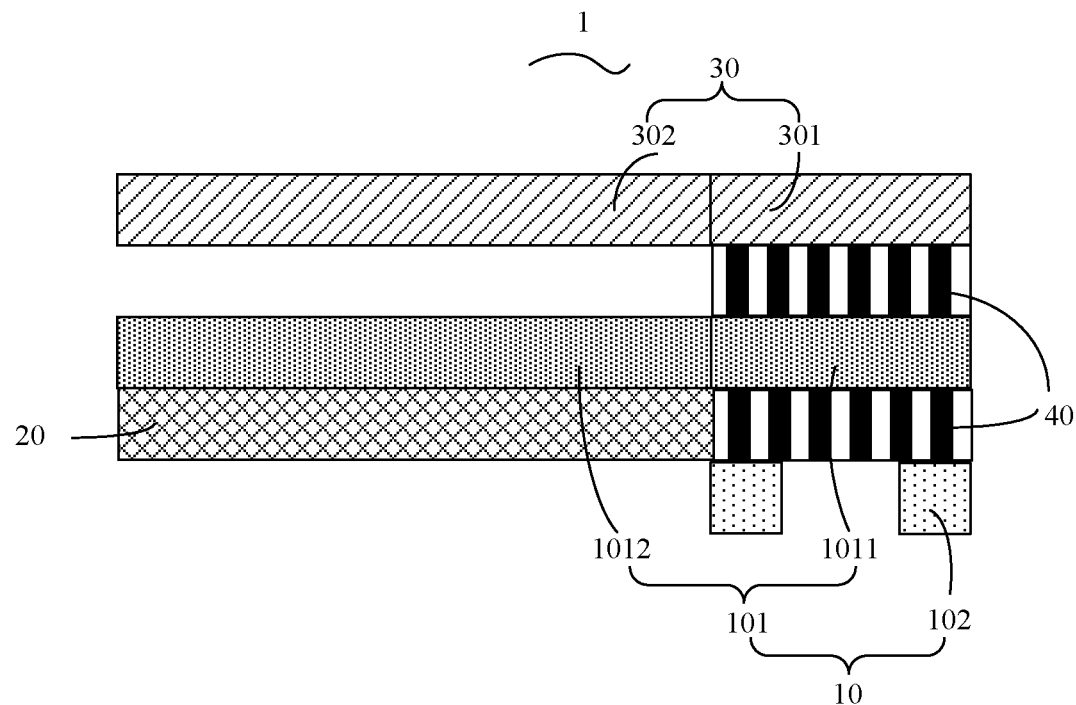
FIG. 8 is a seventh schematic structural diagram of the liquid crystal display device according to an embodiment of the present disclosure.

FIG. 6 is a fifth schematic structural diagram of the liquid crystal display device according to an embodiment of the present disclosure, FIG. 7 is a sixth schematic structural diagram of the liquid crystal display device according to an embodiment of the present disclosure, and FIG. 8 is a seventh schematic structural diagram of the liquid crystal display device according to an embodiment of the present disclosure. As shown in FIGS. 6 to 8, the liquid crystal display device 1 includes the liquid crystal display panel 30, the backlight module, and the sensor.

Wherein, the liquid crystal display panel 30 includes the sensing area 301 and the non-sensing area 302.

The backlight module includes the first light source component 10, a second light source component 20, and the light-shielding layer 40. The first light source component 10 includes the first area 1011 and the second area 1012, the first area 1011 is defined corresponding to the sensing area 301, the second area 1012 is defined corresponding to the non-sensing area 302, and the first area 1011 and the second area 1012 can be controlled to switch between the transparent state and the scattering state, respectively.

Light emitted from the second light source component 20 passes through the second area 1012 to reach the liquid crystal display panel 30, and the light emitted from the first light sources 102 passes through the first area 1011 and the light-shielding layer 40 to reach the liquid crystal display panel 30.

Specifically, the projection of the first optical element 101 on the liquid crystal display panel 30 shown in FIGS. 6 to 8 totally covers the liquid crystal display panel 30, and the first light sources 102 are disposed on the side of the first optical element 101 away from the liquid crystal display panel 30 and correspond to the sensing area 301. The light-shielding layer 40 is disposed between the first optical element 101 and the liquid crystal display panel 30 (referring to FIG. 6 for details), between the first light sources 102 and the first optical element 101 (referring to FIG. 7 for details), or between the first optical element 101 and the liquid crystal display panel 30 and between the first light sources 102 and the first optical element 101 (referring to FIG. 8 for details), and corresponds to the sensing area 301.

The second light source component 20 is disposed on the side of the first optical element 101 away from the liquid crystal display panel 30 and corresponds to the non-sensing area 302. The second light source component 20 is different from the first light source component 10, and does not have a function that can switch between the transparent state and the scattering state. The second light source component 20 may include a second optical element and a second light source. Wherein, the second optical element may sequentially include a reflective sheet, a light guide plate, a diffuser sheet, and a prism sheet disposed in a stack along a direction from the first light source component 10 to the liquid crystal display panel 30, and the second light source is disposed on one side surface of the second optical element or one side of the second optical element away from the liquid crystal display panel 30.

It should be noted that the light-shielding layer 40 in the liquid crystal display device 1 shown in FIG. 7 and the light-shielding layer 40 away from the liquid crystal display panel 30 in the liquid crystal display device 1 shown in FIG. 8 may be attached to the first optical element 101 and the second light source component 20, respectively. In other embodiments, the light-shielding layer 40 can also be moved down for a certain distance, that is, the light-shielding layer 40 is only attached to the second light source component 20.

The following describes working processes of the liquid crystal display device 1 shown in FIGS. 6 to 8, respectively.

For the liquid crystal display device 1 shown in FIG. 6, during the fingerprint recognition, the first optical element 101 is in the transparent state by the control of voltages, the first light sources 102 are turned off, and at this time, the light containing fingerprint information can pass through the light-shielding layer 40 and the first area 1011 in sequence and is received by the fingerprint sensor to perform the fingerprint recognition. At a same time, the second light source component 20 provides the backlight for the non-sensing area 302. That is, light emitted from the second light source component 20 passes through the second area 1012 to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the first optical element 101 and the light-shielding layer 40 in sequence to reach the sensing area 301. At a same time, the second light source component 20 provides the backlight for the non-sensing area 302. That is, the light emitted from the second light source component 20 passes through the second area 1012 to reach the non-sensing area 302.

For the liquid crystal display device 1 shown in FIG. 7, during the fingerprint recognition, the first optical element 101 is in the transparent state by the control of voltages, the first light sources 102 are turned off, and at this time, the light containing fingerprint information can pass through the first area 1011 and the light-shielding layer 40 in sequence and is received by the fingerprint sensor to perform the fingerprint recognition. At a same time, the second light source component 20 provides the backlight for the non-sensing area 302. That is, the light emitted from the second light source component 20 passes through the second area 1012 to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the light-shielding layer 40 and the first area 1011 in sequence to reach the sensing area 301. At a same time, the second light source component 20 provides the backlight for the non-sensing area 302. That is, the light emitted from the second light source component 20 passes through the second area 1012 to reach the non-sensing area 302.

For the liquid crystal display device 1 shown in FIG. 8, during the fingerprint recognition, the first optical element 101 is in the transparent state by the control of voltages, the first light sources 102 are turned off, and at this time, the light containing fingerprint information can pass through the light-shielding layer 40, the first area 1011, and the light-shielding layer 40 in sequence and is received by the fingerprint sensor to perform the fingerprint recognition. At a same time, the second light source component 20 provides the backlight for the non-sensing area 302. That is, the light emitted from the second light source component 20 passes through the second area 1012 to reach the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the light-shielding layer 40, the first optical element 101, and the light-shielding layer 40 in sequence to reach the sensing area 301. At a same time, the second light source component 20 provides the backlight for the non-sensing area 302. That is, the light emitted from the second light source component 20 passes through the second area 1012 to reach the non-sensing area 302.

It should be noted that in order to prevent the light-shielding layer 40 positioned directly above and/or directly below the first optical element 101 from shielding the light containing fingerprint information, the fingerprint sensor may be manufactured as the sensor array having the structure similar to the light-shielding layer 40, and the structure of the light-shielding layer 40 may be optimized, thereby minimizing the impact of shielding of the light-shielding layer 40 on the light containing fingerprint information.

Figure 9:
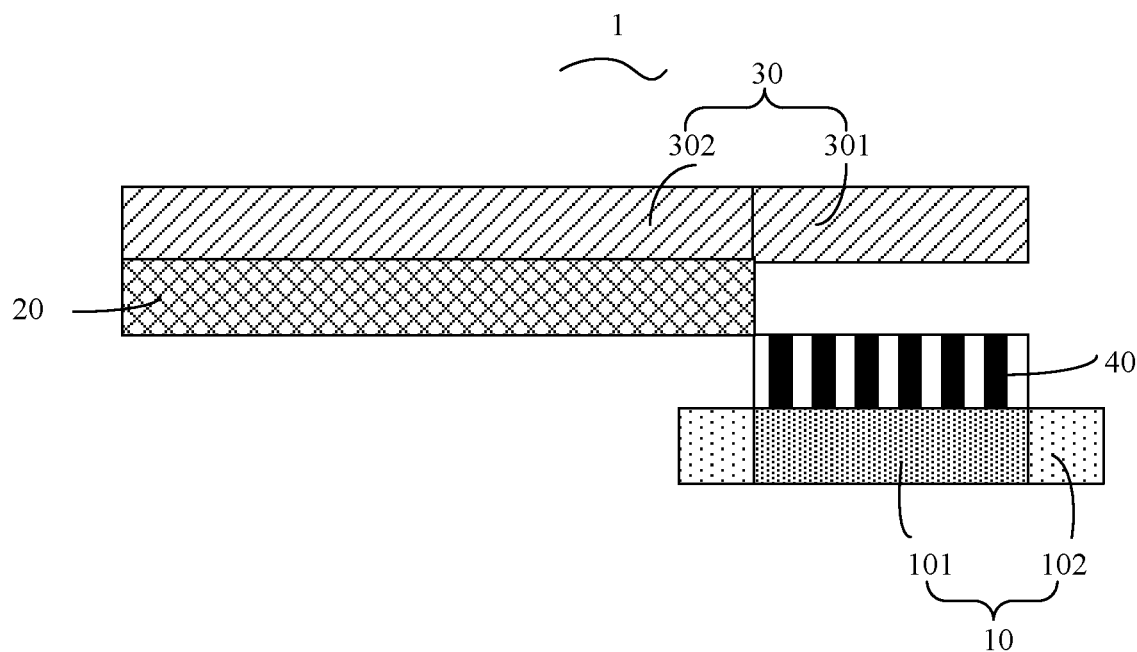
FIG. 9 is an eighth schematic structural diagram of the liquid crystal display device according to an embodiment of the present disclosure.

FIG. 9 is an eighth schematic structural diagram of the liquid crystal display device according to an embodiment of the present disclosure. As shown in FIG. 9, the liquid crystal display device 1 includes the liquid crystal display panel 30, the backlight module, and the sensor.

Wherein, the liquid crystal display panel 30 includes the sensing area 301 and the non-sensing area 302.

The backlight module includes the first light source component 10, the second light source component 20, and the light-shielding layer 40. The second light source component 20 and the first light source component 10 provide backlight in different areas of the liquid crystal display panel 30.

Specifically, the first optical element 101 shown in FIG. 9 is disposed corresponding to the sensing area 301, that is, a projection of the first optical element 101 on the liquid crystal display panel 30 only covers the sensing area 301. The first light sources 102 are disposed on the side surfaces of the first optical element 101, and the light-shielding layer 40 is disposed between the first optical element 101 and the liquid crystal display panel 30 and corresponds to the sensing area 301.

The second light source component 20 is disposed on one side of the liquid crystal display panel 30 adjacent to the first light source component 10 and corresponds to the non-sensing area 302. The second light source component 20 is different from the first light source component 10, and does not have the function that can switch between the transparent state and the scattering state. The second light source component 20 may include the second optical element and the second light source. Wherein, the second optical element may sequentially include the reflective sheet, the light guide plate, the diffuser sheet, and the prism sheet disposed in the stack along the direction from the first light source component 10 to the liquid crystal display panel 30, and the second light source is disposed on the side surface of the second optical element or the side of the second optical element away from the liquid crystal display panel 30.

It should be noted that for the liquid crystal display device 1 shown in FIG. 9, the light-shielding layer 40 may be moved up for a certain distance, and is not limited herein.

The following describes a working process of the liquid crystal display device 1 shown in FIG. 9.

During the fingerprint recognition, the first optical element 101 is in the transparent state by the control of voltages, the first light sources 102 are turned off, and at this time, the light containing fingerprint information can pass through the light-shielding layer 40 and the first optical element 101 in sequence and is received by the fingerprint sensor to perform the fingerprint recognition. At a same time, the second light source component 20 provides the backlight for the non-sensing area 302. That is, the light emitted from the second light source component 20 directly reaches the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the first optical element 101 and the light-shielding layer 40 in sequence to reach the sensing area 301. At a same time, the second light source component 20 provides the backlight for the non-sensing area 302. That is, the light emitted from the second light source component 20 directly reaches the non-sensing area 302.

It should be noted that in order to prevent the light-shielding layer 40 positioned directly above the first optical element 101 from shielding the light containing fingerprint information, the fingerprint sensor may be manufactured as the sensor array having the structure similar to the light-shielding layer 40, and the structure of the light-shielding layer 40 may be optimized, thereby minimizing the impact of shielding of the light-shielding layer 40 on the light containing fingerprint information.

Figure 10:
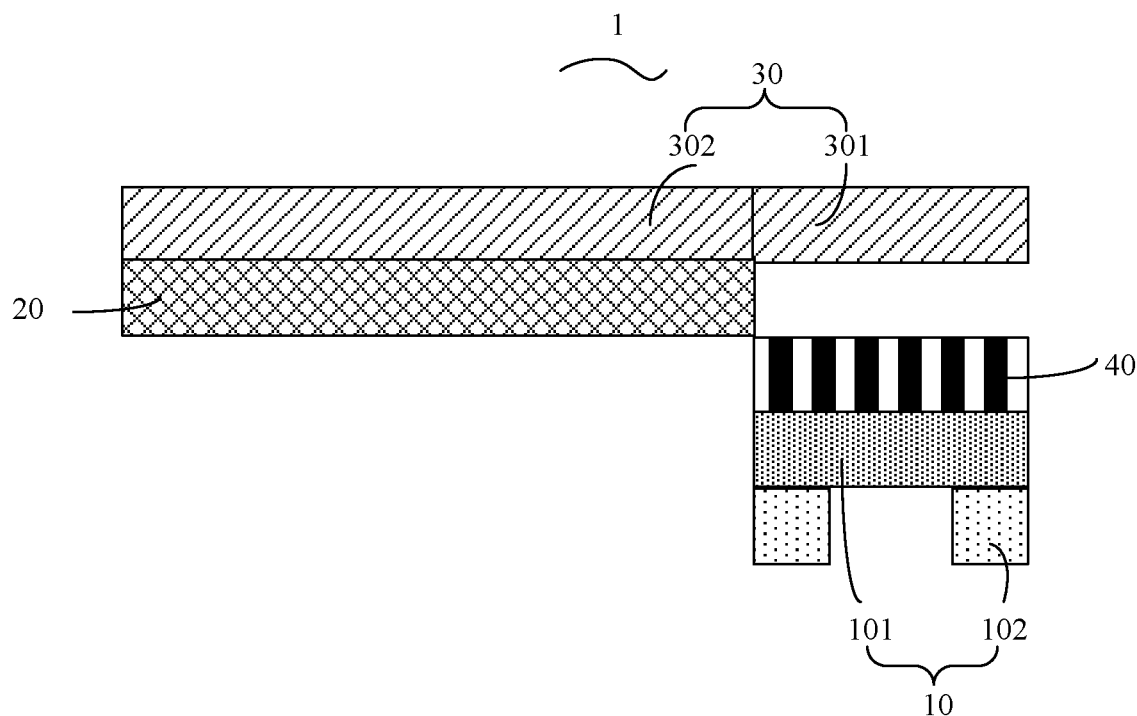
FIG. 10 is a ninth schematic structural diagram of the liquid crystal display device according to an embodiment of the present disclosure.
Figure 11:
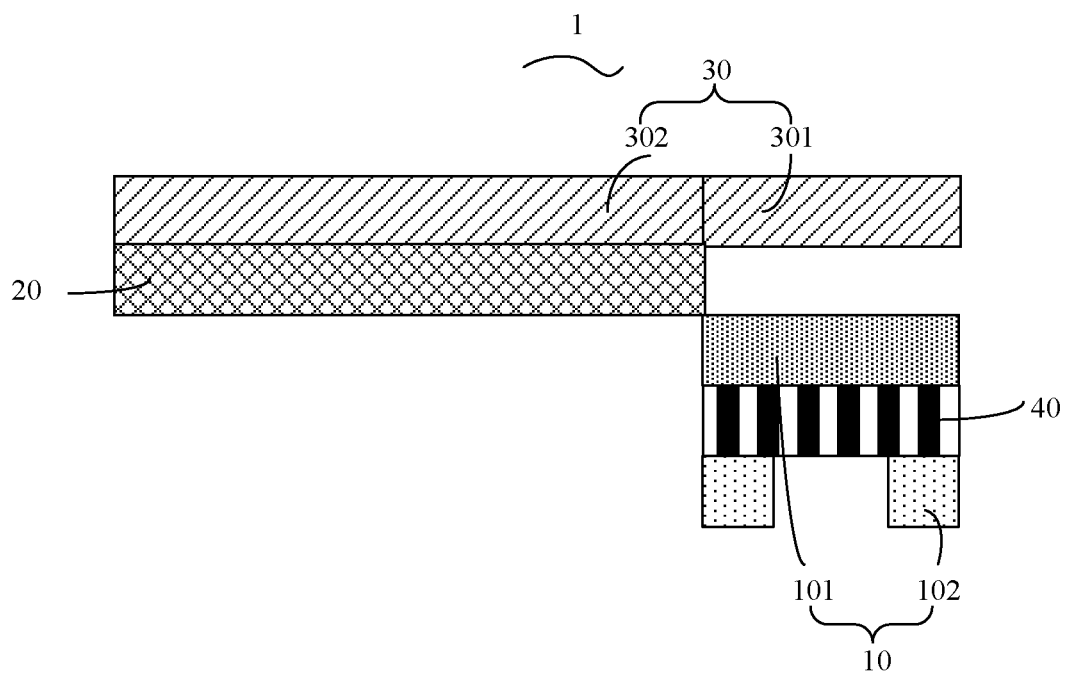
FIG. 11 is a tenth schematic structural diagram of the liquid crystal display device according to an embodiment of the present disclosure.
Figure 12:
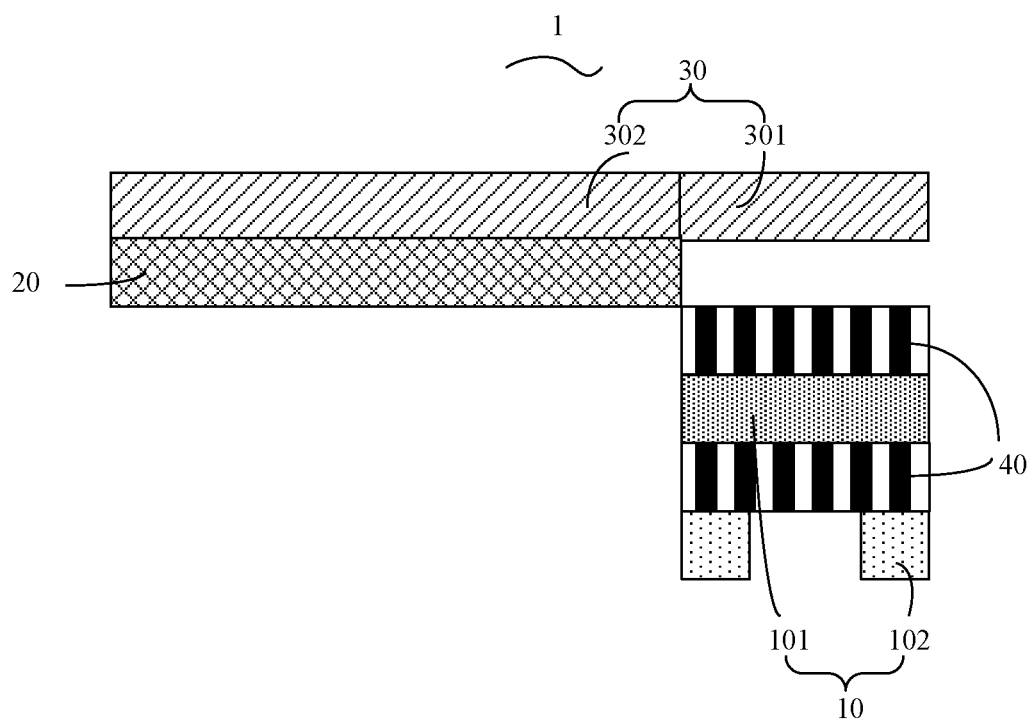
FIG. 12 is an eleventh schematic structural diagram of the liquid crystal display device according to an embodiment of the present disclosure.

FIG. 10 is a ninth schematic structural diagram of the liquid crystal display device according to an embodiment of the present disclosure, FIG. 11 is a tenth schematic structural diagram of the liquid crystal display device according to an embodiment of the present disclosure, and FIG. 12 is an eleventh schematic structural diagram of the liquid crystal display device according to an embodiment of the present disclosure. As shown in FIGS. 10 to 12, the liquid crystal display device 1 includes the liquid crystal display panel 30, the backlight module, and the sensor.

Wherein, the liquid crystal display panel 30 includes the sensing area 301 and the non-sensing area 302.

The backlight module includes the first light source component 10, the second light source component 20, and the light-shielding layer 40. The second light source component 20 and the first light source component 10 provide backlight in different areas of the liquid crystal display panel 30.

Specifically, the first optical element 101 shown in FIGS. 10 to 12 is disposed corresponding to the sensing area 301, that is, the projection of the first optical element 101 on the liquid crystal display panel 30 only covers the sensing area 301. The first light sources 102 are disposed on the side of the first optical element 101 away from the liquid crystal display panel 30 and correspond to the sensing area 301. The light-shielding layer 40 is disposed between the first optical element 101 and the liquid crystal display panel 30 (referring to FIG. 10 for details), between the first light sources 102 and the first optical element 101 (referring to FIG. 11 for details), or between the first optical element 101 and the liquid crystal display panel 30 and between the first light sources 102 and the first optical element 101 (referring to FIG. 12 for details), and corresponds to the sensing area 301.

The second light source component 20 is disposed on the side of the liquid crystal display panel 30 adjacent to the first light source component 10 and corresponds to the non-sensing area 302. The second light source component 20 is different from the first light source component 10, and does not have the function that can switch between the transparent state and the scattering state. The second light source component 20 may include the second optical element and the second light source. Wherein, the second optical element may sequentially include the reflective sheet, the light guide plate, the diffuser sheet, and the prism sheet disposed in the stack along the direction from the first light source component 10 to the liquid crystal display panel 30, and the second light source is disposed on the side surface of the second optical element or the side of the second optical element away from the liquid crystal display panel 30.

It should be noted that the light-shielding layer 40 in the liquid crystal display device 1 shown in FIG. 10 and the light-shielding layer 40 adjacent to the liquid crystal display panel 30 in the liquid crystal display device 1 shown in FIG. 12 may be moved up for a certain distance, and are not specifically limited herein. For the liquid crystal display device 1 shown in FIG. 11, the first optical element 101 may be moved up for a certain distance, and is not specifically limited herein.

The following describes working processes of the liquid crystal display device 1 shown in FIGS. 10 to 12, respectively.

For the liquid crystal display device 1 shown in FIG. 10, during the fingerprint recognition, the first optical element 101 is in the transparent state by the control of voltages, the first light sources 102 are turned off, and at this time, the light containing fingerprint information can pass through the light-shielding layer 40 and the first optical element 101 in sequence and is received by the fingerprint sensor to perform the fingerprint recognition. At a same time, the second light source component 20 provides the backlight for the non-sensing area 302. That is, light emitted from the second light source component 20 directly reaches the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the first optical element 101 and the light-shielding layer 40 in sequence to reach the sensing area 301. At a same time, the second light source component 20 provides the backlight for the non-sensing area 302. That is, the light emitted from the second light source component 20 directly reaches the non-sensing area 302.

For the liquid crystal display device 1 shown in FIG. 11, during the fingerprint recognition, the first optical element 101 is in the transparent state by the control of voltages, the first light sources 102 are turned off, and at this time, the light containing fingerprint information can pass through the first optical element 101 and the light-shielding layer 40 in sequence and is received by the fingerprint sensor to perform the fingerprint recognition. At a same time, the second light source component 20 provides the backlight for the non-sensing area 302. That is, the light emitted from the second light source component 20 directly reaches the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the light-shielding layer 40 and the first optical element 101 in sequence to reach the sensing area 301. At a same time, the second light source component 20 provides the backlight for the non-sensing area 302. That is, the light emitted from the second light source component 20 directly reaches the non-sensing area 302.

For the liquid crystal display device 1 shown in FIG. 12, during the fingerprint recognition, the first optical element 101 is in the transparent state by the control of voltages, the first light sources 102 are turned off, and at this time, the light containing fingerprint information can pass through the light-shielding layer 40, the first optical element 101, and the light-shielding layer 40 in sequence and is received by the fingerprint sensor to perform the fingerprint recognition. At a same time, the second light source component 20 provides the backlight for the non-sensing area 302. That is, the light emitted from the second light source component 20 directly reaches the non-sensing area 302. During the normal display, the first optical element 101 is in the scattering state by the control of voltages, the first light sources 102 are turned on, and at this time, the first optical element 101, the first light sources 102, and the light-shielding layer 40 work together to provide the backlight for the sensing area 301. That is, the light emitted from the first light sources 102 passes through the light-shielding layer 40, the first optical element 101, and the light-shielding layer 40 in sequence to reach the sensing area 301. At a same time, the second light source component 20 provides the backlight for the non-sensing area 302. That is, the light emitted from the second light source component 20 directly reaches the non-sensing area 302.

It should be noted that in order to prevent the light-shielding layer 40 positioned directly above and/or directly below the first optical element 101 from shielding the light containing fingerprint information, the fingerprint sensor may be manufactured as the sensor array having the structure similar to the light-shielding layer 40, and the structure of the light-shielding layer 40 may be optimized, thereby minimizing the impact of shielding of the light-shielding layer 40 on the light containing fingerprint information.

Based on the above embodiments, in the embodiments of the present disclosure, the first optical element 101 includes the first substrate, the second substrate, and the liquid crystals sandwiched between the first substrate and the second substrate, the first substrate and the second substrate are made of the transparent material, and the liquid crystals are polymer dispersed liquid crystals or polymer network liquid crystals.

Based on the above embodiments, in the embodiments of the present disclosure, the second light source component 20 includes the second optical element and the second light source, the second optical element includes the reflective sheet, the light guide plate, the diffuser sheet, and the prism sheet disposed in the stack, and the second light source is disposed on the side surface of the second optical element or the side of the second optical element away from the liquid crystal display panel 30.

Based on the above embodiments, in the embodiments of the present disclosure, cross-sectional shapes of the gratings are rectangular and have a same size, thereby preventing a phenomenon of nonuniform display. Wherein, a width w of the gratings ranges from 1 to 50 μm, and a height h of the gratings ranges from 1 to 100 μm. Since different aspect ratios (h/w values) can achieve different ranges of viewing angles, specific values of h and w can be determined according to actual needs for the ranges of viewing angles. Preferably, the widths of the light transmission gaps are the same. In other embodiments, the shapes of the gratings may also be different from each other, the sizes of the gratings may also be different from each other, the widths of the light transmission gaps may also be different from each other, and a cross-sectional shape of any one of the gratings may also be other shape that can reduce a viewing angle of incident light, such as circular or oval, which is not specifically limited herein.

Referring to FIGS. 2 to 12, an embodiment of the present disclosure further provides the liquid crystal display device 1, which includes the liquid crystal display panel 30, the sensor, and the backlight module provided by one of the above embodiments. The sensor is disposed on one side of the backlight module away from the liquid crystal display panel 30 and corresponds to the sensing area 301. Since the foregoing embodiments have described the specific structure and working principle of the liquid crystal display device 1 in detail, it will not be repeated here. Specifically, the liquid crystal display device 1 may be a mobile phone, a computer, and a smart wearable device, and is not specifically limited herein. Since the backlight module provided in the embodiments above can ensure the light emitted to the liquid crystal display panel to have the narrower viewing angle, thereby improving the uniformity of backlight, applying the backlight module provided in the embodiments above to the liquid crystal display device 1 can improve the display effect of the liquid crystal display device 1.

It can be understood that for a person of ordinary skill in the art, equivalent replacements or changes can be made according to the technical solution of the present disclosure and its inventive concept, and all these changes or replacements should fall within the protection scope of the claims attached to the present disclosure.

What is claimed is:

1. A backlight module for providing backlight to a liquid crystal display panel comprising a sensing area and a non-sensing area, the backlight module comprising:
   a first light source component and a light-shielding layer, wherein the first light source component comprises a first optical element and a first light source, the first optical element is switchable between a transparent state and a scattering state, and the first light source is disposed on a side surface of the first optical element or a side of the first optical element away from the liquid crystal display panel;
   the light-shielding layer is disposed on a light path of light emitted from the first light source to the liquid crystal display panel and comprises a plurality of gratings arranged at intervals, each of the gratings is made of a light-shielding material, and a light transmission gap is formed between every two adjacent ones of the gratings; and
   the first optical element comprises a first area opposite to the sensing area and a second area opposite to the non-sensing area, and the first area is switchable between the transparent state and the scattering state.

2. The backlight module according to claim 1, wherein the first light source is disposed on the side surface of the first optical element, and the light-shielding layer is disposed between the first optical element and the liquid crystal display panel.

3. The backlight module according to claim 1, wherein the first light source is disposed on the side of the first optical element away from the liquid crystal display panel, and the light-shielding layer is disposed between the first optical element and the liquid crystal display panel or between the first light source and the first optical element.

4. The backlight module according to claim 1, wherein the first light source is disposed on the side of the first optical element away from the liquid crystal display panel and opposite to the sensing area, and the light-shielding layer is disposed between the first optical element and the liquid crystal display panel or between the first light source and the first optical element and opposite to the sensing area; and
   the backlight module further comprises a second light source component disposed on the side of the first optical element away from the liquid crystal display panel and opposite to the non-sensing area.

5. The backlight module according to claim 1, wherein the first optical element is disposed opposite to the sensing area, the first light source is disposed on the side surface of the first optical element, and the light-shielding layer is disposed between the first optical element and the liquid crystal display panel and opposite to the sensing area; and
   the backlight module further comprises a second light source component disposed between the first optical element and the liquid crystal display panel and opposite to the non-sensing area.

6. The backlight module according to claim 1, wherein the first optical element is disposed opposite to the sensing area, the first light source is disposed on the side of the first optical element away from the liquid crystal display panel, and the light-shielding layer is disposed between the first optical element and the liquid crystal display panel or between the first light source and the first optical element and opposite to the sensing area; and
   the backlight module further comprises a second light source component disposed between the first optical element and the liquid crystal display panel and opposite to the non-sensing area.

7. The backlight module according to claim 1, wherein respective cross-sectional shapes of the gratings are rectangles of a same size, a width of each of the gratings ranges from 1 μm to 50 μm, and a height of each of the gratings ranges from 1 μm to 100 μm.

8. The backlight module according to claim 1, wherein the first optical element comprises a first substrate, a second substrate, and liquid crystal sandwiched between the first substrate and the second substrate, the first substrate and the second substrate are made of a transparent material, and the liquid crystal is polymer dispersed liquid crystal or polymer network liquid crystal.

9. The backlight module according to claim 4, wherein the second light source component comprises a second optical element and a second light source, the second optical element comprises a reflective sheet, a light guide plate, a diffuser sheet, and a prism sheet which are stacked, and the second light source is disposed on a side surface of the second optical element or a side of the second optical element away from the liquid crystal display panel.

10. A liquid crystal display device, comprising a liquid crystal display panel, a sensor, and a backlight module;
wherein the liquid crystal display panel comprises a sensing area and a non-sensing area;
the backlight module is configured to provide backlight to the liquid crystal display panel and comprises a first light source component and a light-shielding layer,
wherein the first light source component comprises a first optical element and a first light source, the first optical element is switchable between a transparent state and a scattering state, and the first light source is disposed on a side surface of the first optical element or a side of the first optical element away from the liquid crystal display panel; and
the light-shielding layer is disposed on a light path of light emitted from the first light source to the liquid crystal display panel and comprises a plurality of gratings arranged at intervals, each of the gratings is made of a light-shielding material, and a light transmission gap is formed between every two adjacent ones of the gratings; and
the sensor is disposed on a side of the backlight module away from the liquid crystal display panel and opposite to the sensing area.

11. The liquid crystal display device according to claim 10, wherein the first optical element comprises a first area opposite to the sensing area and a second area opposite to the non-sensing area, and the first area is is switchable between the transparent state and the scattering state.

12. The liquid crystal display device according to claim 11, wherein the first light source is disposed on the side surface of the first optical element, and the light-shielding layer is disposed between the first optical element and the liquid crystal display panel.

13. The liquid crystal display device according to claim 11, wherein the first light source is disposed on the side of the first optical element away from the liquid crystal display panel, and the light-shielding layer is disposed between the first optical element and the liquid crystal display panel or between the first light source and the first optical element.

14. The liquid crystal display device according to claim 11, wherein the first light source is disposed on the side of the first optical element away from the liquid crystal display panel and opposite to the sensing area, and the light-shielding layer is disposed between the first optical element and the liquid crystal display panel or between the first light source and the first optical element and opposite to the sensing area; and
the backlight module further comprises a second light source component disposed on the side of the first optical element away from the liquid crystal display panel and opposite to the non-sensing area.

15. The liquid crystal display device according to claim 10, wherein the first optical element is disposed opposite to the sensing area, the first light source is disposed on the side surface of the first optical element, and the light-shielding layer is disposed between the first optical element and the liquid crystal display panel and opposite to the sensing area; and
the backlight module further comprises a second light source component disposed between the first optical element and the liquid crystal display panel and opposite to the non-sensing area.

16. The liquid crystal display device according to claim 10, wherein the first optical element is disposed opposite to the sensing area, the first light source is disposed on the side of the first optical element away from the liquid crystal display panel, and the light-shielding layer is disposed between the first optical element and the liquid crystal display panel or between the first light source and the first optical element and opposite to the sensing area; and
the backlight module further comprises a second light source component disposed between the first optical element and the liquid crystal display panel and opposite to the non-sensing area.

17. The liquid crystal display device according to claim 10, wherein respective cross-sectional shapes of the gratings are rectangles of a same size, a width of each of the gratings ranges from 1 μm to 50 μm, and a height of each of the gratings ranges from 1 μm to 100 μm.

18. The liquid crystal display device according to claim 10, wherein the first optical element comprises a first substrate, a second substrate, and liquid crystals crystal sandwiched between the first substrate and the second substrate, the first substrate and the second substrate are made of a transparent material, and the liquid crystal is polymer dispersed liquid crystals crystal or polymer network liquid crystal.

19. The liquid crystal display device according to claim 14, wherein the second light source component comprises a second optical element and a second light source, the second optical element comprises a reflective sheet, a light guide plate, a diffuser sheet, and a prism sheet which are stacked, and the second light source is disposed on a side surface of the second optical element or a side of the second optical element away from the liquid crystal display panel.

20. A backlight module for providing backlight to a liquid crystal display panel comprising a sensing area and a non-sensing area, the backlight module comprising:
a first light source component and a light-shielding layer,
wherein the first light source component comprises a first optical element and a first light source, the first optical element is switchable between a transparent state and a scattering state, and the first light source is disposed on a side surface of the first optical element;
the light-shielding layer is disposed on a light path of light emitted from the first light source to the liquid crystal display panel and comprises a plurality of gratings arranged at intervals, each of the gratings is made of a light-shielding material, and a light transmission gap is formed between every two adjacent ones of the gratings;
the first optical element is disposed opposite to the sensing area, and the light-shielding layer is disposed between the first optical element and the liquid crystal display panel and opposite to the sensing area; and
the backlight module further comprises a second light source component disposed between the first optical element and the liquid crystal display panel and opposite to the non-sensing area.

* * * * *